UNITED STATES PATENT OFFICE.

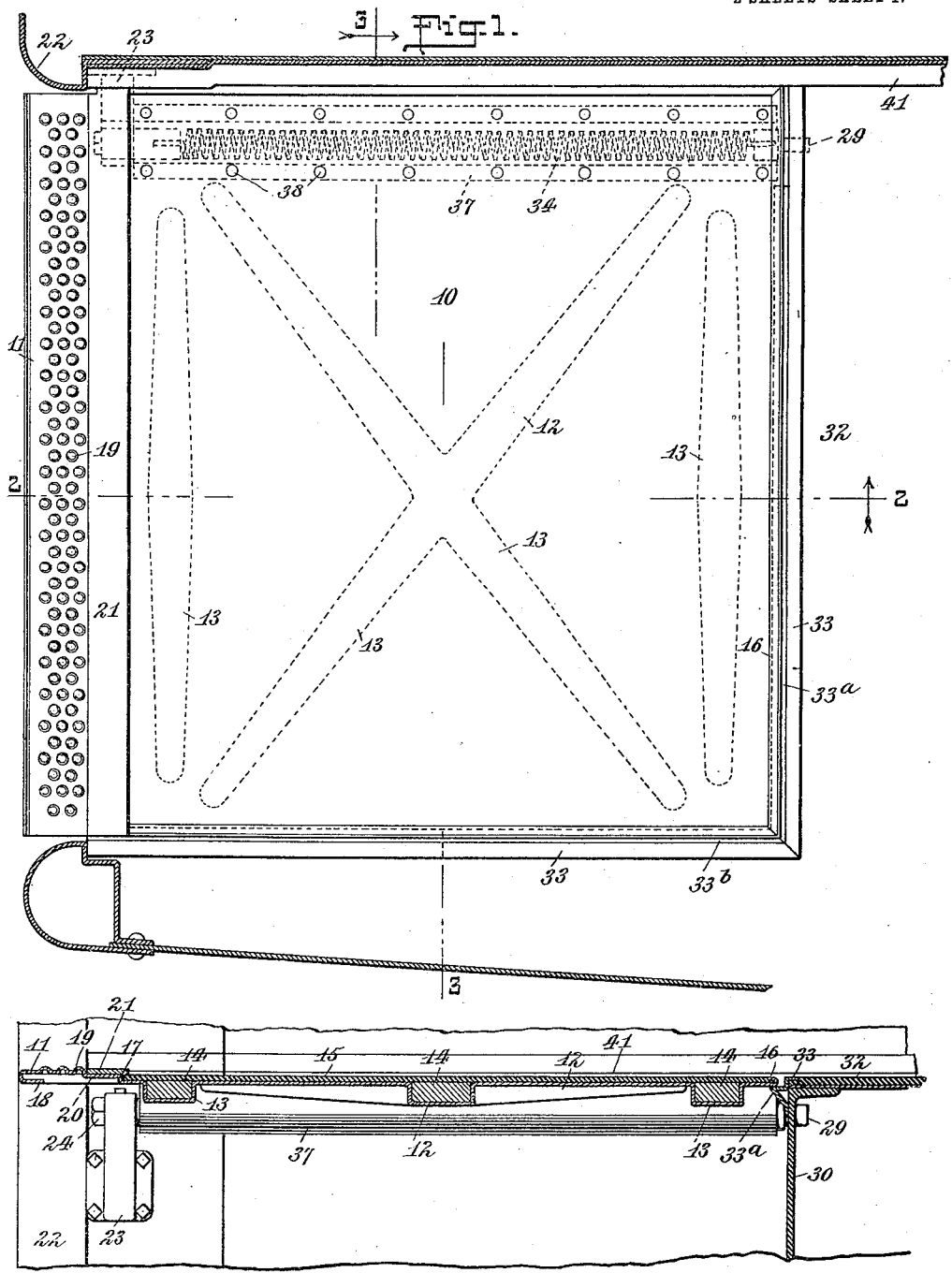

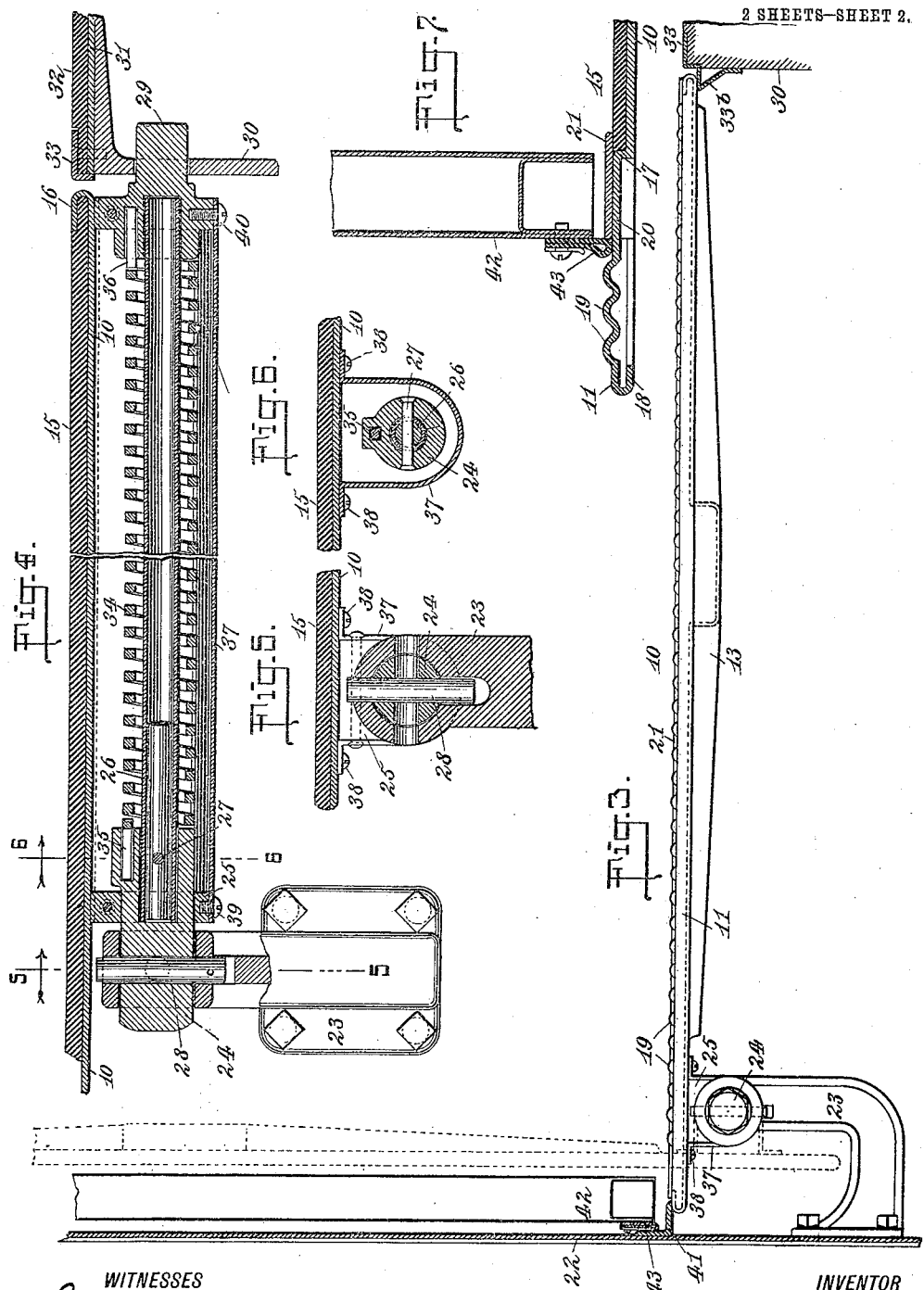

WALTER L. CONWELL, OF UPPER MONTCLAIR, NEW JERSEY.

TRAP-DOOR FOR PLATFORMS OF VESTIBULE RAILROAD-CARS.

1,125,065.  Specification of Letters Patent.  Patented Jan. 19, 1915.

Application filed July 11, 1914. Serial No. 850,284.

*To all whom it may concern:*

Be it known that I, WALTER L. CONWELL, a citizen of the United States, and a resident of Upper Montclair, in the county of Essex and State of New Jersey, have made and invented certain new and useful Improvements in Trap-Doors for Platforms of Vestibule Railroad-Cars, of which the following is a specification.

My invention relates to trap doors for platforms of vestibule railroad cars, the object being to improve upon like structures heretofore made for the same purpose, particularly with reference to its strength, weight, appearance, economy of manufacture, and efficiency, a further object being to so hinge the door to its support that it may be easily and readily adjusted to automatically raise or lift to any desired extent or position when the lock, holding the same in its closed position, is released.

A further object of the invention is to provide means whereby to effectually exclude dust or dirt, snow, or other foreign matter therefrom, which, in ordinary structures, finding its way between the lower end of the vestibule door and the trap door, lodges around the edge of the latter, in many instances causing said trap door to stick and bind and prevent its being raised to its open position by the spring employed for that purpose.

With these and other ends in view, the invention consists in certain novel features of construction and combinations of parts as will be hereinafter fully described and pointed out in the claims.

In the accompanying drawings, Figure 1 is a top plan view of a trap door constructed in accordance with my invention. Fig. 2 is a sectional view thereof taken on the line 2—2 of Fig. 1 looking in the direction as indicated by the arrow. Fig. 3 is a sectional view taken on the line 3—3 of Fig. 1 looking in the direction as indicated by the arrow, the trap door being illustrated in elevation. Fig. 4 is a longitudinal sectional view taken through the lifting spring. Fig. 5 is a sectional view taken on the line 5—5 of Fig. 4. Fig. 6 is a sectional view taken on the line 6—6 of Fig. 4, and Fig. 7 is a sectional view on an enlarged scale through a portion of the trap door and illustrating a portion of the vestibule door.

Referring to the drawings, 10 represents the trap door, made of sheet metal and preferably stamped up from sheet steel, the door being approximately square in outline, the front portion thereof being provided with an integral threshold 11. In the door proper 10 are formed the channels 12, these channels forming strengthening ribs and extending diagonally from corner to corner and gradually increasing in depth from the outer ends to the center where these ribs or channels meet, as clearly illustrated in Figs. 2 and 3. These diagonally extending channels also gradually taper in width, increasing from their outer ends toward the center, as illustrated in Fig. 1. In addition to these diagonally extending channels the door is also formed with the channels 13, one located near the rear edge of the door and the other near the front edge, and extending transversely thereof; these channels 13, like the channels 12, gradually increasing in width from the outer ends to about the center of their length, and also gradually increasing in depth in the same direction, this conformation adding materially to the strength and rigidity of the door and permitting of the use of sheet metal of much less thickness than would otherwise be required to obtain the same strength and stiffness.

As illustrated in Fig. 2, in order to give to the door proper 10 a smooth and flush surface, these channels 12 and 13 have contained therein the wooden strips 14, or, if desired, may be filled with any well known composition, as flexolith, or the like, the upper or tread surface of the door being then covered with rubber or composition cloth or tiling 15, the sheet metal 10 on the rear edge of the door being preferably turned over as illustrated at 16, Figs. 2 and 3, to assist in holding or securing the rubber mat or tiling 15 in place, and forming a neat and finished edge therefor.

The forward edge of the sheet metal plate 10, forming the door proper, is continued to form the threshold 11, this threshold being slightly raised above the upper surface of the door 10 as clearly illustrated in Fig. 2, thereby forming a shoulder 17 against which the mat 15 abuts, the extreme outer edge 18 of the metal being bent or curved downwardly and under the threshold to form a finished edge, the forward portion of the threshold being preferably provided with the knobs or raised dome-shaped portions 19 whereby to prevent slipping thereon, a portion 20 of the threshold being left plain to form a seat or rest for the steel strip 21, welded or otherwise secured thereto, and the rear edge of which overlaps the matting 15 to assist in holding or securing the forward edge of the latter down onto the metal plate 10. To the body end post 22 of the car is secured a hinge bracket 23, through the vertical arms of which passes the adjusting nut 24 of the hinge adapted to raise the door from its closed position as illustrated in full lines, Fig. 3, to its elevated position as shown in dotted lines, this adjusting nut 24 passing through a bearing 25 rigidly secured to the metal door 10 and onto which fits one end of the arbor or pintle 26, the hinge extending on one side of the door approximately from edge to edge as illustrated in Figs. 1 and 2. The arbor or pintle 26 is secured against rotation in the adjusting nut 24 by means of the pin or screw 27 (Fig. 4), the adjusting nut itself being held against rotation by means of the pin 28 passing down through an opening in the top of the bracket 23 and through an opening in the adjusting nut 24, this pin of course being removed when it is desired to turn the nut 24 to thereby increase or decrease the tension of the spring as hereinafter described. To the opposite end of the door or plate 10 is rigidly secured the pivotal support 29 in which rests the opposite end of the pintle or arbor 26, this support extending through an opening formed in the top step riser 30 of the car platform and in which latter the support turns or rotates, this riser, as illustrated in Fig. 4, in order to harmonize in appearance with the trap door, having secured on the upper side thereof the sheet metal plate 31, and to the latter the mat or tiling 32, corresponding to the mat 15 on the trap door, a platform nosing 33 securing the edge thereof to the riser 30, which nosing being bent out into the form of a bracket 33, forms a ledge or support for the rear edge of the platform door when closed; said nosing, being continued around the edge of the platform, also forming a bracket or support 33$^b$ for the transverse edge of the trap door when the latter is closed as illustrated in Fig. 3.

Around the pintle or arbor 26 is coiled a spring 34, one end 35 fitting into a recess formed in the adjusting nut 24, and the opposite end 36 fitting into a recess formed in the support 29, the result of this construction and assemblage of parts being to retain the platform door in its raised or elevated position as illustrated in dotted lines in Fig. 3, the tension on the spring 34 being such as to raise and retain it in its vertical position, or, if desired, the tension on the spring 34 may be such as to partially lift it to its vertical position, whereupon it may be elevated by hand to its vertical position and there locked in the usual way, the tension on the spring being adjusted by removing the pin 28 and turning the adjusting nut 24 in the proper direction to increase or decrease the tension thereon as may be desired, the pin 28 being subsequently inserted in place through the adjusting nut and the bracket 23 to retain the several parts in their proper relative positions.

In order to exclude any dust, dirt, or other foreign material from the spring, I preferably surround the same by a housing 37 formed of sheet metal and of a shape as illustrated in Figs. 5 and 6, that is, U-shape in cross-section and having its edges outwardly flanged to secure the same to the under side of the sheet metal plate 10 by means of the screws or other fastenings 38, this housing 37 being also secured to the bearing 25 by means of the screws 39, and to the pivotal support 29 by the screw 40 as illustrated in Fig. 4, this housing effectually inclosing the contained spring 34 and avoiding, for all practical purposes, the interior thereof against the entrance of dirt or snow.

To the body of the car and to the body end post 22 is secured the angle iron 41, onto the horizontal arm of which fits one edge of the trap door when closed, as illustrated in Fig. 3, this angle iron affording a weather-tight joint to the hinged end of the door. To further prevent the entrance of foreign material into the trap door, I secure to the lower end of the vestibule door 42 the weather stripping 43, which, when the door is closed as illustrated in Fig. 7, fits or abuts against the outer edge of the steel strip 21, this strip, in conjunction with the weather strip 43, effectually closing the opening or space between the threshold 11 and the lower end of the vestibule door 42 against the entrance of snow or other foreign material from the outer side to the interior of the vestibule, and overcoming to a great extent all danger of ice or snow finding its way around the edges of the trap door and causing the same to bind in the platform nosing.

From the foregoing it will be understood that my improved trap door is exceedingly simple and strong in construction, the door proper being formed or stamped from a single piece of sheet metal, which, being strengthened by the channels tapering in width and breadth as described, may be formed of comparatively light stock without in any wise detracting from its stiffness or rigidity. Furthermore, it will be understood that, hinged as it is to the platform by a spring the tension of which is capable of any desired adjustment, it may be automatically raised to any extent, that is, either to a vertical position or to a slanting position when released by the lock employed to hold it in its lowered or closed position, and that to a great extent the interior of the vestibule is closed against the entrance of cinders, dirt, snow or other foreign matter.

What I claim is:—

1. A trap door for vestibule cars comprising a door proper and an integral threshold stamped from a single piece of sheet metal, the threshold being offset from the door proper.

2. A trap door for vestibule cars comprising a door proper provided with an integral threshold offset therefrom and formed from a single piece of sheet metal, the door proper being provided with channels varying in depth and width.

3. A trap door for vestibule cars comprising a door proper and a threshold formed from a single piece of sheet metal, the door proper being provided with channels varying in width and depth, a portion of the said threshold being roughened and the remaining portion left plain, and a strip secured to the plain portion of said threshold.

4. A trap door for railway cars comprising a door proper and a threshold offset therefrom and formed from a single piece of sheet metal, a covering on the upper surface of said door proper, and a strip secured to said threshold the edge of which extends over and upon the covering on said door proper.

5. In a door of the character described the combination with a vestibule platform, of a vestibule door, a trap door provided with a threshold formed integral therewith and extending out beyond said vestibule door when the latter is closed, a strip secured to said threshold, and a weather strip secured to the lower end of said vestibule door and fitting against the strip on said threshold when said vestibule door is closed.

6. A trap door for vestibule cars comprising a door proper provided with a threshold and formed from a single piece of sheet metal, a covering on said door proper the rear edge of said sheet metal being bent over and upon said covering, and a strip secured to said threshold and extending over and upon the forward edge of said covering.

7. A trap door for vestibule cars comprising a door proper, a threshold formed integral therewith and provided throughout a portion of its area with a roughened surface, the remainder thereof being left plain, said door proper being provided with channels varying in width and depth and containing a filling whereby to present a surface flush with the upper surface of said door proper, a covering for said door proper, and a strip secured to the plain surface of said threshold and having its edge extending over and upon said covering on said door proper.

Signed at New York, borough of Manhattan, in the county of New York and State of New York, this 9" day of July, A. D. 1914.

WALTER L. CONWELL.

Witnesses:
ANNA V. WALSH,
GEORGE E. COOK.